US011919001B2

(12) United States Patent
Josephides et al.

(10) Patent No.: US 11,919,001 B2
(45) Date of Patent: Mar. 5, 2024

(54) DROPLET DISPENSING SYSTEMS

(71) Applicant: SPHERE FLUIDICS LIMITED, Babraham (GB)

(72) Inventors: Dimitris Josephides, Babraham (GB); Marian Rehak, Babraham (GB); David Holmes, Babraham (GB); Frank F. Craig, Babraham (GB)

(73) Assignee: SPHERE FLUIDICS LIMITED, Cambridge (GB)

( * ) Notice: Subject to any disclaimer, the term of this patent is extended or adjusted under 35 U.S.C. 154(b) by 769 days.

(21) Appl. No.: 16/625,021

(22) PCT Filed: Jun. 21, 2018

(86) PCT No.: PCT/GB2018/051743
§ 371 (c)(1),
(2) Date: Dec. 20, 2019

(87) PCT Pub. No.: WO2018/234821
PCT Pub. Date: Dec. 27, 2018

(65) Prior Publication Data
US 2020/0215546 A1 Jul. 9, 2020

(30) Foreign Application Priority Data
Jun. 22, 2017 (GB) ..................................... 1710002

(51) Int. Cl.
*B01L 3/00* (2006.01)

(52) U.S. Cl.
CPC ... *B01L 3/502784* (2013.01); *B01L 3/502761* (2013.01); *B01L 3/502715* (2013.01); *B01L 2200/027* (2013.01); *B01L 2200/0652* (2013.01); *B01L 2200/0673* (2013.01); *B01L 2400/0487* (2013.01)

(58) Field of Classification Search
CPC ......... B01L 3/502784; B01L 3/502715; B01L 2200/027; B01L 2400/0487
See application file for complete search history.

(56) References Cited

U.S. PATENT DOCUMENTS

2015/0089998 A1* 4/2015 Tipler .................... G01N 30/66 73/23.42
2017/0151558 A1* 6/2017 Hiddessen .............. B01L 9/527

FOREIGN PATENT DOCUMENTS

| | | | | |
|---|---|---|---|---|
| GB | 2495182 | B | 3/2016 | |
| JP | 2010-525325 | A | 7/2010 | |
| JP | 2011-527011 | A | 10/2011 | |
| JP | 2015-142586 | A | 8/2015 | |
| JP | 2016-517281 | A | 12/2016 | |
| WO | 2016024095 | A1 | 2/2016 | |
| WO | 2016193758 | A1 | 12/2016 | |
| WO | WO-2016193758 | A1 * | 12/2016 | .......... B01L 3/50273 |

OTHER PUBLICATIONS

Japanese Office Action with translation dated May 16, 2022.

* cited by examiner

*Primary Examiner* — Sahana S Kaup
(74) *Attorney, Agent, or Firm* — Renner Kenner Greive Bobak Taylor & Weber Co. LPA

(57) ABSTRACT

This invention generally relates to methods and systems for dispensing a droplet, in particular a picolitre volume droplet containing one or more entities. We disclose herein a microfluidic droplet dispensing system comprising: a droplet feed line to carry droplets for dispensing; a dispensing line to carry dispensing fluid for dispensing the droplets; a droplet outlet line coupled to a droplet outlet; a first junction having a first input to receive a flow from said droplet feed line, having a second input to receive a flow from said dispensing line and having an output to said droplet outlet line; a waste line coupled to said droplet output line between said first junction and said droplet output; a first pressure source to provide pressurised dispensing fluid to said dispensing line to eject droplets from said droplet output; a droplet dispensing valve between said first pressure source and said dispensing line to control the ejection of droplets from said droplet output; wherein the system further comprises: a second pressure source to provide pressurised dispensing fluid to a droplet protect line; a second junction having a first input from said droplet feed line, having a second input from said droplet protect line, and having an output; and a volume flow throttle coupled between the output of said second junction and the first input of said first junction to restrict a volume flow from said second junction into said first junction.

15 Claims, 4 Drawing Sheets

DROPLET DISPENSING SYSTEMS

FIELD OF THE INVENTION

This invention generally relates to methods and systems for dispensing a droplet, in particular a picodroplet containing one or more entities.

BACKGROUND TO THE INVENTION

The droplet dispensing techniques described herein generally, but not exclusively, relate to emulsions, typically comprising microdroplets of water in oil, generally surfactant-stabilised. One or more biological entities such as one or more living cells or particles may be incorporated into each droplet and then experiments performed within the droplet, for example to perform a biological assay. Microvolume droplets (microdroplets) can be generated and processed potentially at rates in excess of several thousand per second.

Typically the oil composition comprises a fluorous and/or mineral oil and, preferably, a surfactant, for example at around 0.5-5% vol/vol. Use of a fluorous oil is particularly advantageous when the microdroplets contain living entities because fluorous oil is good at transporting oxygen to the microdroplets. The surfactant may be either polymeric or small molecule; for example surfactants derived from block co-polymers of perfluoroethers such as Krytox™ or polyethylene glycol (PEG) may be used. The material or analyte within a microdroplet may comprise, for example, cells, DNA, protein, peptide, beads, particles, crystals, micelles, macromolecules, material for an enzymatic assay, organelles, an organism such as cell for example a mammalian cell, yeast cell, algal cell or bacterium, a virus, a prion and so forth. Typically a picolitre volume droplet (a picodroplet) has a diameter in the range 1-120 μm although droplets may be larger (or smaller), giving a volume which may be in the range nanolitres to femtolitres.

The inventors have identified some problems with existing techniques for processing and dispensing such droplets. In particular pressure fluctuations within a microfluidic device associated with the dispensing can disrupt droplets within the device. In addition the dispensing process can sometimes cause droplets, or parts of droplets, to travel into unintended microfluidic channels (lines).

Further background prior art can be found in patent publications US2014/162262, GB2495182A, US2015/125947, US2009/320930, US2008/261295, and US2016/136643.

SUMMARY OF THE INVENTION

In a first aspect the invention provides a microfluidic droplet dispensing system, the system comprising: a droplet feed line to carry droplets for dispensing; a dispensing line to carry dispensing fluid for dispensing the droplets; a droplet outlet line coupled to a droplet outlet; a first junction having a first input to receive a flow from said droplet feed line, having a second input to receive a flow from said dispensing line and having an output to said droplet outlet line; a waste line coupled to said droplet output line between said first junction and said droplet output; a first pressure source to provide pressurised dispensing fluid to said dispensing line to eject droplets from said droplet output; a droplet dispensing valve between said first pressure source and said dispensing line to control the ejection of droplets from said droplet output; wherein the system further comprises: a second pressure source to provide pressurised dispensing fluid to a droplet protect line; a second junction having a first input from said droplet feed line, having a second input from said droplet protect line, and having an output; and a volume flow throttle coupled between the output of said second junction and the first input of said first junction to restrict a volume flow from said second junction into said first junction.

Thus in one aspect we describe a microfluidic droplet dispensing system, typically but not essentially comprising a plurality of channels or lines on a polymer, or other, substrate. The system may include one or more valves, pumps and the like, which may be on/within or separate from the substrate. The polymer substrate, and optionally one or more of the additional components, may be in the form of a disposable/consumable cartridge.

In one embodiment the droplet dispensing system includes a droplet feed line to carry droplets for dispensing, typically in a single or double emulsion of the general type previously described, comprising aqueous droplets in carrier oil. A dispensing line is provided to carry dispensing fluid, typically the carrier oil, for dispensing the droplets. A droplet outlet line is coupled to a droplet outlet or nozzle. Such a nozzle may include a mechanism to disrupt a droplet/separate it from the emulsion, for example a mesh, electrodes, or a line for adding de-emulsifier.

A first junction has a first input to receive a flow from the droplet feed line, a second input to receive a flow from the dispensing line, and has an output to the droplet outlet line. A waste line is coupled to the droplet output line between the first junction and the droplet output. The waste line, to which suction, for example a vacuum pump, is typically applied, may function to suck unwanted material to waste.

A first pressure source may provide pressurised dispensing fluid to the dispensing line to eject droplets from said droplet output, and a droplet dispensing valve is located between the first pressure source and the dispensing line to control the ejection of droplets from said droplet output. The droplet dispensing valve opens briefly to dispense a droplet (for example this may operate with a mark:space ratio of order 1000:1).

A second pressure source may provide pressurised dispensing fluid to a droplet protect line. The droplet protect line provides the pressurised dispensing fluid to one input of a second junction, which has another input from the droplet feed line. A volume flow throttle is coupled between the output of the second junction and the first input of the first junction to restrict a volume flow from the second junction to the first junction. In preferred embodiments, but not necessarily, the second pressure source provides continuous pressure; alternatively it may be synchronised with the dispensing valve. The second pressure source may be a different pressure source to the first, but conveniently the same pressure source is employed for both.

In broad terms embodiments of the system pressurise the fluidics at a junction upstream of a dispensing junction (where the dispensing pressure is applied), to protect the upstream fluidics. The pressurisation may be substantially continuous. To reduce a volume flow into the dispensing junction, which would otherwise result excess carrier fluid (mainly oil) exiting the droplet outlet, a throttle is applied between the second and first junctions. Preferably the flow is throttled such that the volume flow in the droplet outlet line is no greater than the capacity of the waste line to carry such the unwanted material to waste. Additionally or alternatively the volume flow may be (further) throttled to slow the droplets prior to dispensing, to aid in imaging and/or droplet analysis, for example a florescent measurement. Still further additionally or alternatively the volume flow may be throttled to limit the amount of reagents used per dispense cycle. The skilled person will appreciate that a pressure source does not necessarily provide a constant volume flow (unlike, say, a syringe pump).

In a related aspect the invention provides a method of microfluidic droplet dispensing, the method comprising: receiving droplets for dispensing in a droplet feed line; providing said droplets for dispensing to a droplet outlet line coupled to a droplet outlet; allowing a waste flow from said droplet outlet line; controlling the ejection of droplets from said droplet output by selectively applying increased pressure to said droplet outlet line; and protecting droplets in said droplet feed line from said selectively applied increased pressure by pressurising a region of said droplet feed line upstream of a location where said increased pressure is applied.

Another problem that can arise with dispensing systems of this general type is that droplets, or parts thereof, intended for dispensing can instead travel into the waste line.

In a further aspect the invention therefore provides a microfluidic droplet dispensing system, the system comprising: a droplet feed line to carry droplets for dispensing; a dispensing line to carry dispensing fluid for dispensing the droplets; a droplet outlet line coupled to a droplet outlet; a first junction having a first input to receive a flow from said droplet feed line, having a second input to receive a flow from said dispensing line and having an output to said droplet outlet line; a waste line coupled to said droplet output line at a waste line junction between said first junction and said droplet output; a first pressure source to provide pressurised dispensing fluid to said dispensing line to eject droplets from said droplet output; a droplet dispensing valve between said first pressure source and said dispensing line to control the ejection of droplets from said droplet output; wherein the system further comprises: an injection line, coupled to the waste line, to inject fluid into the waste line in synchrony with opening of the dispensing valve.

Preferably the method also includes restricting a volume flow in/through the droplet feed line downstream of the point at which the increased pressure is applied.

In embodiments, by injecting carrier fluid into the waste line, preferably adjacent the waste line junction, the droplets intended for dispensing can be protected. In embodiments the injection line is coupled to a pressure source which provides increased pressure in synchrony with the dispensing valve. This may be achieved using the same or a second pressure source, coupled to an injection valve operated in synchrony with the droplet dispensing valve, to provide pressure to the injection line in synchrony with the droplet dispensing valve. Additionally or alternatively the injection line may be coupled to the dispensing line (that is, upstream of the first junction), so that it is pressurised by and receives a portion of the flow from the dispensing valve. The injection line may then be configured to throttle the flow rate through the line sufficiently that droplets are not forced back up the outlet line against the normal flow direction; and optionally to limit excess oil exiting the droplet outlet. However the pressure/flow should be sufficient to substantially prevent droplets (or parts thereof) intended for dispensing from instead travelling to waste.

The skilled person will appreciate that preferred embodiments of the droplet dispensing system may combine both the above described techniques (upstream pressurization and waste line injection) in a single system.

In a further aspect the invention provides a method of dispensing a droplet of a fluid, the method comprising: receiving droplets in a droplet outlet line from a droplet feed line; ejecting a droplet from said droplet outlet line through droplet outlet by providing a pressurised dispensing fluid into said droplet outlet line; receiving droplets in a waste line from droplet outlet line when pressurised dispensing fluid is not provided into droplet outlet line; and protecting droplets upstream of said droplet outlet line by providing pressurised dispensing fluid upstream of droplet outlet line.

Preferably the method also includes maintaining the pressure upstream of the droplet outlet line at an equal or higher pressure to the droplet outlet line.

The pressurised dispensing fluid applied upstream of the droplet outlet line may be from the same source as the pressurised dispensing fluid applied to the droplet outlet line.

The method may also include regulating the flow-rate of fluid entering the droplet outlet line using a volume flow throttle upstream of the droplet outlet line.

In a further aspect the invention provides a method of dispensing a droplet of fluid, the method comprising: receiving droplets in a droplet outlet line from a droplet feed line; ejecting a droplet from said droplet outlet line through droplet outlet by providing a pressurised dispensing fluid into said droplet outlet line; receiving droplets in a waste line when pressurised dispensing fluid is not provided into droplet outlet line; and injecting fluid into the waste line when pressurised dispensing fluid is provided into droplet outlet line.

The fluid injected into the waste line may from the same source as the pressurised dispensing fluid applied to the droplet outlet line.

In the above described systems and methods one or more of the lines (channels) may have a fluorinated internal wall. This facilitate stability, protection and movement of the droplets. In the above described systems and methods the dispensing fluid may comprise an oil carrier including one or more fluorinated surfactants, similarly to stabilise, protect and facilitate movement of droplets.

In broad terms we will also describe a microfluidic structure for dispensing defined volumes of fluid or particles in a suspension, the structure comprising: at least two sample inlet flows, a sample dispensing nozzle, a detection channel where portions of the enclosed fluid or particles are selected and dispensed via a dispensing nozzle and other portions are sent to a separate waste channel.

We also describe a microfluidic structure for dispensing defined volumes of fluid or particles in a suspension, the structure comprising: at least two sample inlet flows, a sample dispensing nozzle, a detection channel where portions identified using a physical, physicochemical or biological detection methods are selected and dispensed via a dispense nozzle and the other portions are sent to a separate waste channel.

The detection methods may include both physicochemical (e.g. optical, electrochemical, calorimetric, thermal, mass-sensitive, acoustic, magnetic, nanowire sensing or mechanical) and/or biological detection methods and combinations of both.

We also describe a microfluidic structure for dispensing defined volumes of fluid or particles in a suspension, the structure comprising: at least two sample inlet flows, a sample dispensing nozzle, a waste channel, a pressure balancing side channel, a pressure resistor, and a detection channel where portions identified using a physical detection method are selected and directed in a controlled way to give improved and more accurate dispensing or waste removal.

The pressure balancing side channel may provide passive control of the fluid and pressure network.

Alternatively, the pressure balancing side channel may provide active control of the fluid and pressure network by modulating a connected valve either incorporated within or external to the microfluidic structure.

The pressure regulation network of the microfluidic structure may be controlled by the physical dimensions, design and shape of the microfluidic structure.

The dispensing nozzle may be of a defined shape. Preferably, the nozzle may have a defined shape which allows accurate and controlled dispensing with minimal loss of material.

Optionally, the nozzle and microfluidic structure may be manufactured in an integrated format from the same mold at the same time.

We also describe a microfluidic structure which may contain a dispensing outlet which is positioned within a larger cavity. This can reduce sample wicking and loss by preventing lateral movement of the sample and thus can improve dispensing.

A part of a microfluidic structure may be coated with a surface energy modifying coating.

The materials used for the manufacture of the microfluidic structure may be semi-rigid or rigid-solid.

The microfluidic structure may use emulsions. The emulsions may be used to compartmentalise various fluids or particles to ease their analysis, selection and dispensing. Optionally, the emulsions may be stabilised by surfactants and/or chemical or physical means or non-stabilised.

In broad terms we describe a method that uses a microfluidic structure for dispensing defined volumes of fluid or particles in a suspension, the structure comprising: at least two sample inlet flows, a sample dispensing nozzle, a detection channel where portions of the enclosed fluid or particles are selected and dispensed via a dispensing nozzle and other portions are sent to a separate waste channel.

We also describe a method that uses a microfluidic structure for dispensing defined volumes of fluid or particles in a suspension, the structure comprising: at least two sample inlet flows, a sample dispensing nozzle, a detection channel where portions identified using a physical, physicochemical and/or biological detection methods are selected and dispensed via a dispense nozzle and the other portions are sent to a separate waste channel.

Additionally we also describe a method that uses a microfluidic structure which may contain a dispensing outlet which is positioned within a larger cavity which can reduce sample wicking and loss by preventing lateral movement of the sample and thus can improve dispensing.

In broad terms we describe a system that uses a microfluidic structure for dispensing defined volumes of fluid or particles in a suspension, the structure comprising: at least two sample inlet flows, a sample dispensing nozzle, a detection channel where portions of the enclosed fluid or particles are selected and dispensed via a dispensing nozzle and other portions are sent to a separate waste channel.

We also describe a system that uses a microfluidic structure for dispensing defined volumes of fluid or particles in a suspension, the structure comprising: at least two sample inlet flows, a sample dispensing nozzle, a detection channel where portions identified using a physical, physicochemical and/or biological detection methods are selected and dispensed via a dispense nozzle and the other portions are sent to a separate waste channel.

Additionally we also describe a system that uses a microfluidic structure which may contain a dispensing outlet which is positioned within a larger cavity which can reduce sample wicking and loss by preventing lateral movement of the sample and thus can improve dispensing.

We also describe a system that uses a microfluidic structure for dispensing defined volumes of fluid or particles in a suspension, the structure comprising: at least two sample inlet flows, a sample dispensing nozzle, a detection channel where portions of the enclosed fluid or particles are selected and dispensed via a dispensing nozzle and other portions are sent to a separate waste channel.

We also describe a system that uses a microfluidic structure for dispensing defined volumes of fluid or particles in a suspension, the structure comprising: at least two sample inlet flows, a sample dispensing nozzle, a detection channel where portions identified using a physical detection method are selected and dispensed via a dispense nozzle into a receptacle or target area and the other portions are sent to a separate waste channel.

We also describe a system that uses a microfluidic structure which contains a dispensing outlet which is positioned within a larger cavity which reduces sample wicking and loss by preventing lateral movement of the sample and thus improves dispensing to a receptacle or target area.

Within this specification fluids may include but is not limited to gases, liquids, emulsions, suspensions, colloids, gels and aerosols.

Particles may include but is not limited to beads, powders, crystals, quantum dots, cells and precipitates.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION OF PREFERRED EMBODIMENTS

Droplet Dispensing Systems

Figure 1:
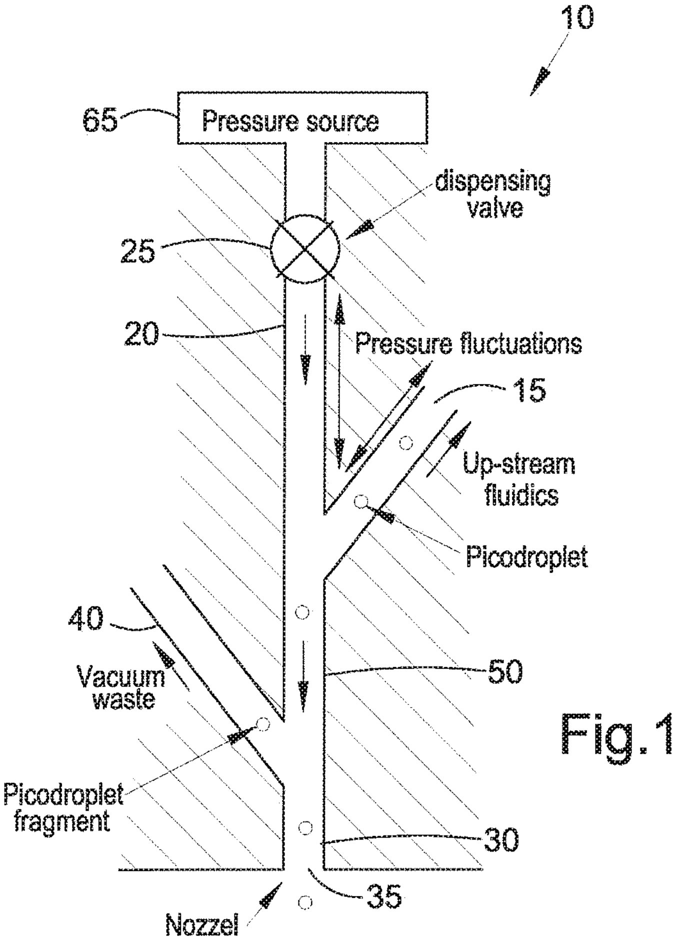
FIG. 1 shows a schematic illustration of an exemplary double T-junction droplet dispensing unit.

Referring to FIG. 1, this shows a schematic illustration of an example of a droplet dispensing unit with two T-junctions.

The dispensing unit 10 has a first input channel 15 which provides picodroplets (droplets with a volume of less than 1 nl). The dispensing unit 10 has a first output channel 40 which flows to waste, and a second output channel 30 which provides an outlet for the dispensing unit 10 for ejecting selected droplets for collection in a reservoir. The droplets are ejected through a nozzle 35. A second input channel 20 is coupled to the dispensing valve 25, in this example to receive compressed air. In this way a pressure pulse can be applied to the emulsion flowing in the second output channel 30 to eject a slug of emulsion containing a selected, target droplet for collection in a well of a multi-well reservoir. Typically the pressure pulse is applied by carrier fluid, more particularly oil, but a gas (air) may also be employed. The same applies to the later described systems. A dispensing valve 25 actuates when a droplet suitable for dispensing is detected. There is a shared channel portion 50 between the input and output channels.

The double T-junction dispensing technique described above makes no allowance for pressure fluctuations caused by the opening and closing of the dispensing valve 25. It might be assumed that these pressure fluctuations would have no effect on the properties of the flow up-stream. However from practical experimentation it appears that these pressure fluctuations can cause disruption to picodroplet spacing and cause high flowrate reverse flows. This can cause potential sheering and destruction of picodroplets. Further, when the dispensing valve 25 actuates, there is a significant probability that a picodroplet selected for dispensing will instead travel down the vacuum waste line 40.

A dispenser 10 of the type shown in FIG. 1 may have the form of a flat plate or substrate bearing microfluidic channels; this may also include one or more holding regions, valves and the like. It is preferably substantially optically transparent, and may be fabricated from a range of plastic materials, for example polydimethylsiloxane (PDMS) or cyclic olefin polymer or copolymer (COP or COC). The substrate may then be mounted vertically or at a suitable angle in a droplet processing system/instrument with the dispenser output channel 30 directed downwards towards a multi-well or microtitre plate. The instrument may then move the cartridge and/or plate to direct the output channel 30 into a selected well.

A suitable microdroplet processing system/instrument is described in our patent publication WO2016/193758, hereby incorporated by reference; such an instrument may thus incorporate a (disposable) microfluidic cartridge. The instrument may have one or more reservoirs holding an aqueous medium, generally including growth media, within which biological entities such as mammalian cells, bacteria or the like are held for processing. A set of one or more reservoirs may hold oil for providing an emulsion at various stages of the system; these may be as part of the instrument or part of the cartridge. One of the reservoirs may provide eluent, which is oil used to/for extraction and ejection of target droplets. Optionally a dispenser portion of the cartridge/substrate may have one or more droplet sensing regions, used to identify when a droplet is present in the flow and to control the timing of the droplet ejection accordingly in order to eject a slug of emulsion. For example an optical droplet detection region may be provided downstream of the first T-junction, more particularly between the first and second T-junctions of the dispenser.

Examples of such an instrument may be used for identifying a very few, extremely rare droplets containing a biological entity of interest from a very large population. An on-substrate droplet sorter may then operate one or two orders of magnitude faster than the droplet dispenser—for example the dispenser may operate at 1-10 Hz whereas the sorter may operate at 100-1,000 Hz. Thus one or more emulsion flow buffer regions may be provided between a sorting region and the dispensing region of the substrate, to control an emulsion flow rate to the droplet dispenser. In embodiments such a buffer region may comprise a chamber where droplets can accumulate whilst excess oil is siphoned off or released to waste, or a length of microfluidic channel. The characteristics of droplets may be measured in or after their exit (in sequence) from the buffer region, for example optically, so that when the droplets are dispensed into wells/reservoirs the properties of the droplet(s) within particular well/reservoir are known. In this way droplet contents (for example a cell, protein, antibody, reagent or analyte) with a desired/target property can be retrieved after droplet dispensing.

The output channel of the dispenser may include a mechanism to promote liberation of a droplet, or the contents of a droplet, from the emulsion.

An ejected slug of emulsion may have a volume of 50-300 nl or 50-2000 nl (depending in part upon the channel width and valve opening time) whilst a droplet may have a volume of order 50 pl or larger. When a slug of emulsion is ejected, the water from a droplet, and its contents, may end up floating on the surface of the oil. The droplet ejection mechanism may therefore include a system to extract the droplet from the emulsion and/or to break up a droplet. This may be achieved mechanically by shaping, for example narrowing, a nozzle of the dispenser output channel and/or by providing a mesh across the output channel; and/or this may be achieved electrically, for example by providing a pair of electrodes adjacent the exit of the dispenser output channel across which a voltage can be applied to generate an electric field to disrupt the emulsion/droplet; and/or a chemical mechanism may be employed, for example by adding a stream of de-emulsification agent such as perfluorooctanol into the dispenser output channel.

In some preferred embodiments, the microfluidic substrate, in particular in its cartridge embodiment, may include one or more sensors, for example identifying and/or tracking droplets with desirable characteristics.

As already described, in some embodiments the droplet ejection mechanism comprises a mechanism to increase a pressure in the emulsion flow to direct droplets into the dispenser output channel. In some embodiments this may be achieved by arranging the dispenser output so that it has a main channel and a side channel (in a form of T-junction) and then applying a pressure pulse to drive a droplet into the side channel for output. In one embodiment such an arrangement may comprise a pair of valves, such as pinch valves, along the length of an emulsion flow with the side channel. In this way the valves can be closed to isolate the flow and then pressure applied to the isolated slug of emulsion, to drive the emulsion containing the droplet into the dispenser output channel. In another approach a slug of emulsion may be transferred from a first channel/flow to a second, where a pressure pulse may be applied to eject the slug and its associated droplet. The skilled person will recognise that other configurations are possible. A suitable pressure pulse may be provided mechanically, for example using a piezoelectric transducer. Alternatively a pressure pulse may be generated electrically, for example by means of an electrical heating element and bubble expansion (in a similar manner to an ink-jet printer). In some preferred embodiments an increased pressure pulse is applied to eject a slug of emulsion with its droplet, but the skilled person will appreciate that in principle the arrangements we describe later may be adapted so that instead a pulse of reduced pressure is used to eject droplets from an emulsion flow into the dispenser output channel.

In some preferred implementations it is convenient to physically separate the droplet ejection mechanism from the system used to sense/detect the presence of a droplet for ejection. In embodiments this may be achieved by using the instrument housing the substrate/cartridge (microdroplet processing system) to sense one or both of the position and the speed of a droplet selected by the sorting system for ejection. The sensing may be performed upstream of the droplet ejection mechanism so that the position of the droplet can be predicted when the droplet reaches the ejection mechanism. In principle droplet speed need not be measured if the rate of flow of emulsion can be controlled sufficiently accurately, but in practice measuring the speed is advantageous. It is further advantageous to control the channel size tolerance, to reduce variations in channel size and hence droplet speed variations. Imaging the droplets in a separate location to the droplet ejection mechanism in this manner makes the cartridge/instrument simpler and more effective.

Improved Techniques

Figure 2:
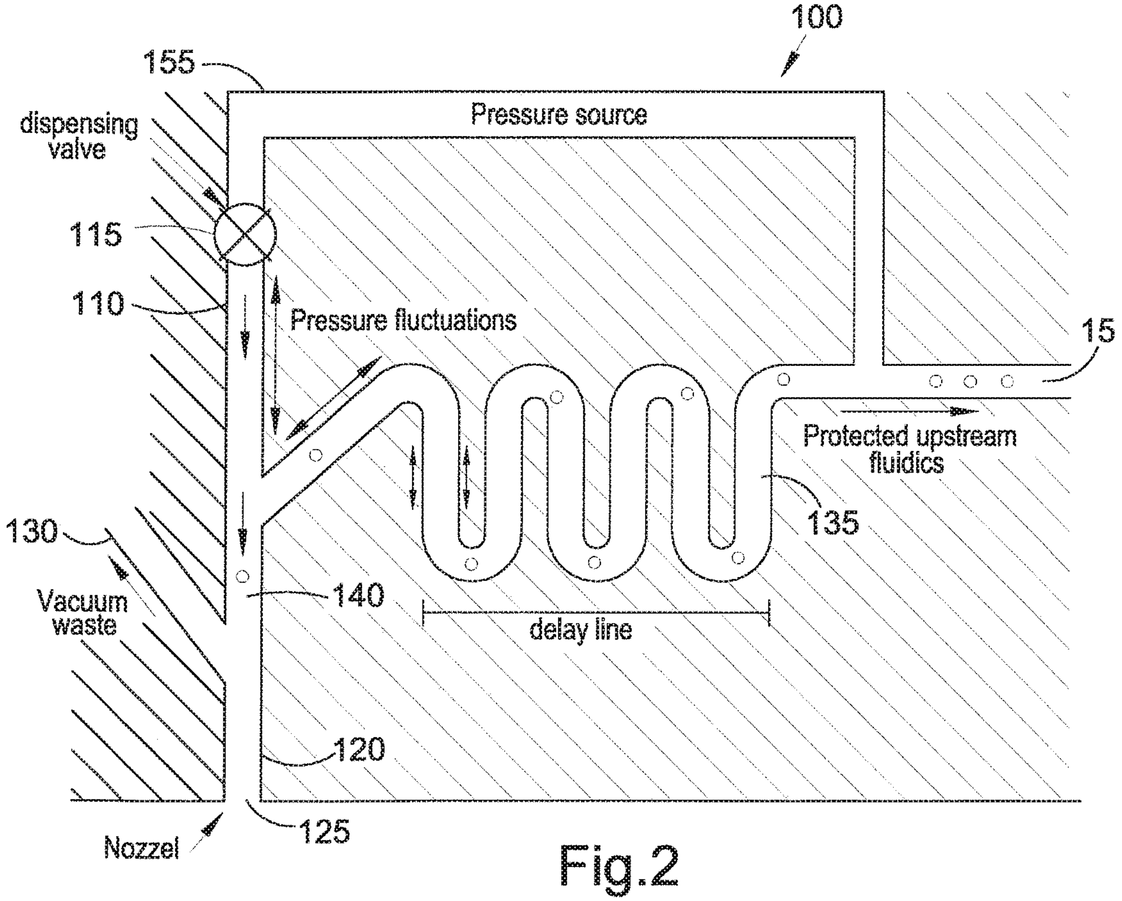
FIG. 2 shows a schematic illustration of a double T-junction droplet dispensing unit with protected up-stream fluids and a delay line according to an embodiment of the present invention.

Referring now to FIG. 2, this shows a schematic illustration of a double T-junction droplet dispensing unit with protected up-stream fluids and a delay line according to one embodiment of the present invention.

The dispensing unit 100 has a first input channel or droplet feed line 105 which provides picodroplets. The dispensing unit 100 has a first output channel or droplet outlet line 130 which flows to waste, and a second output channel or waste line 120 which provides an outlet for the dispensing unit 100 for ejecting selected droplets. The droplets are ejected through a nozzle or droplet outlet 125 for collection in a reservoir. A second input channel or dispensing line 110 is coupled to the droplet dispensing valve 115, in this example to receive compressed air from a pressure source 155. There is a shared channel portion 140 between the input 105, 110 and output 120, 130 channels. When the droplet dispensing valve 115 actuates a pressure pulse can be applied to the emulsion flowing in the shared channel portion 140 to eject a slug of emulsion containing a selected, target droplet for collection in a well of a multi-well reservoir. Excess oil and unselected droplets are prevented from being dispensed as the first output channel 130 is kept a lower pressure such that when the dispensing valve is not actuating it is preferable for oil to leave the system through the waste channel 130 rather than being dispensed through the nozzle 125.

The first input channel 105 is coupled to the pressure source 155 such that the upstream fluids are kept at a constant pressure, equal to or higher than the dispensing pressure. This protects fluidic behaviour upstream of the first input channel 105 when the dispensing valve actuates, reducing pressure fluctuations and shearing of picodroplets. A length of delay line or volume flow throttle 135 connects the first input channel 105 and the second input channel 110 between the two ports both coupled with the pressure source. Although referred to as a delay line, the function of line 135 is generally to act as a flow restriction line or volume throttle, to reduce a volume flow into the output channel, compensating for the increased upstream pressure. It will also be appreciated, however, that the rate (number of droplets per second) flowing from the droplet feed line through the dispenser is unchanged by the configuration of FIG. 2.

The pressure source 155 introduces oil into the delay/flow restriction line 135 and increases spacing between picodroplets, regulating the flow-rate of droplets entering the shared channel portion 140 and the output channels 120, 130. When the dispensing valve 115 is not being actuated there is a pressure drop across the delay line/flow restriction 135. In order to prevent excess oil from the pressure source 155 continuously entering the shared channel portion 140 and leaving the system through the nozzle 125, it is desirable that the flow rate of oil entering the shared channel portion 140 is not greater than the flow rate that the vacuum waste line 130 can remove from the system. The delay line/flow restriction 135 provides fluid resistance (and may also have a degree of compliance in its structure) to reduce the amount of oil entering the shared channel portion 140 when the dispensing valve 115 is not being actuated. The pressure source 155 introduces oil into the delay line 135 and increases spacing between picodroplets, regulating the flow-rate of droplets entering the shared channel portion 140 and the output channels 120, 130.

It will be appreciated that the first input channel 105 may be coupled to the same pressure source as the second input channel 110 or may be coupled to a pressure source with a pressure equal to or higher than the dispensing pressure coupled to the second input channel 110.

Figure 3:
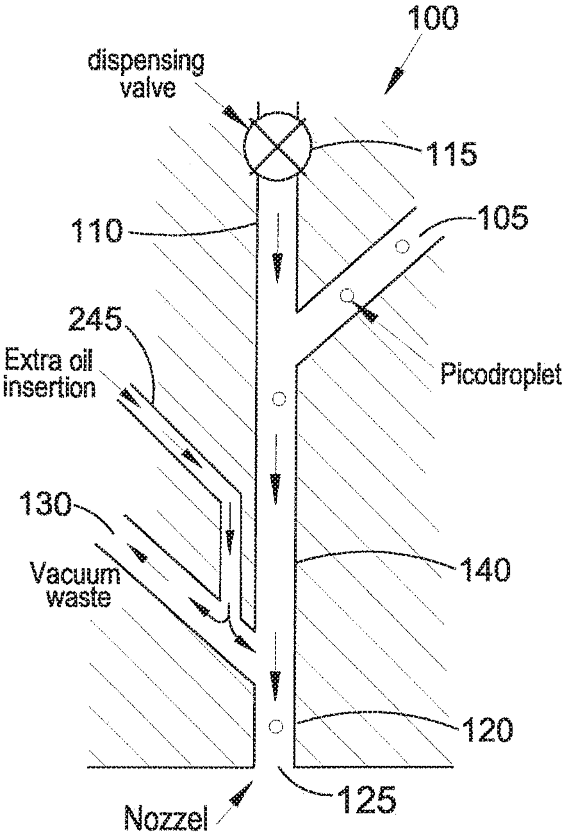
FIG. 3 shows a schematic illustration of a double T-junction droplet dispensing unit with a system for injecting oil to prevent excess waste droplets according to an embodiment of the present invention.

FIG. 3 shows a schematic illustration of a double T-junction droplet dispensing unit 100 with a system for injecting oil to prevent excess picodroplets travelling down the waste output channel 130 according to one embodiment of the present invention. Many features of this embodiment are the same as those shown in FIG. 2 and therefore carry the same reference numerals, however a third input channel or injection line 245 is connected to the first output channel 130. The third input channel 245 is connected to the first output channel 130 directly after droplets enter the first output channel 130. Oil is injected into this channel 245 at the same time as the dispensing valve 115 actuates. This reduces the amount of picodroplets selected for dispensing entering the first output channel 130 and leaving the system as waste. The amount of oil injected is tuned such that it is enough to stop picodroplets entering the waste output channel 130 but a minimal amount of fluid is dispensed.

Figure 4:
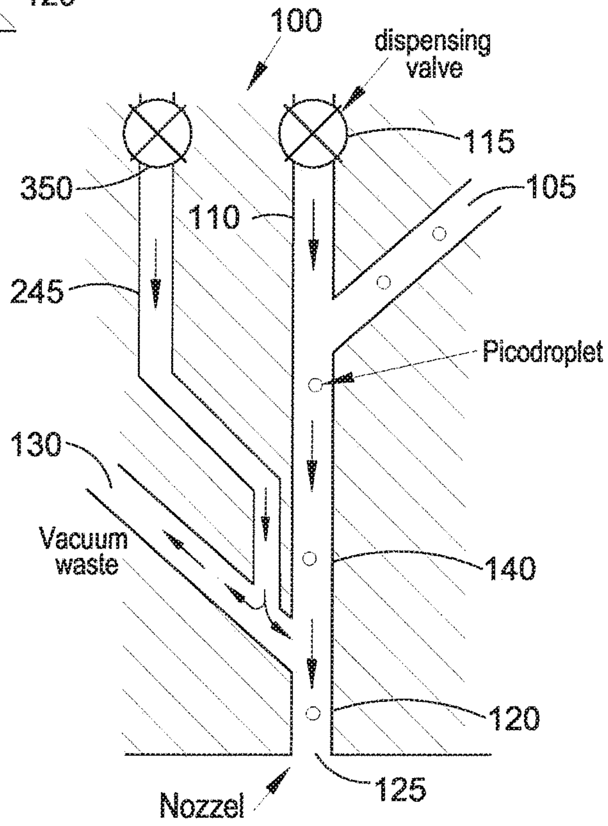
FIG. 4 shows a schematic illustration of a double T-junction droplet dispensing unit with a system for injecting oil using a valve synchronised with the dispensing valve to prevent excess waste droplets according to an embodiment of the present invention.

FIG. 4 shows a schematic illustration of a double T-junction droplet dispensing unit with a system for injecting oil from a synchronized valve to prevent excess waste droplets according to one embodiment of the present invention. Many features of this embodiment are the same as those shown in FIG. 3 and therefore carry the same reference numerals, however the third input channel 245 is couple to a second valve 350. The second valve 350 is synchronised with the first dispensing valve 115 such that the desired amount of oil can be injected into the third input channel 245. The amount of oil injected is tuned such that it is enough to stop picodroplets entering the waste output channel 130 but a minimal amount of fluid is dispensed.

Figure 5:
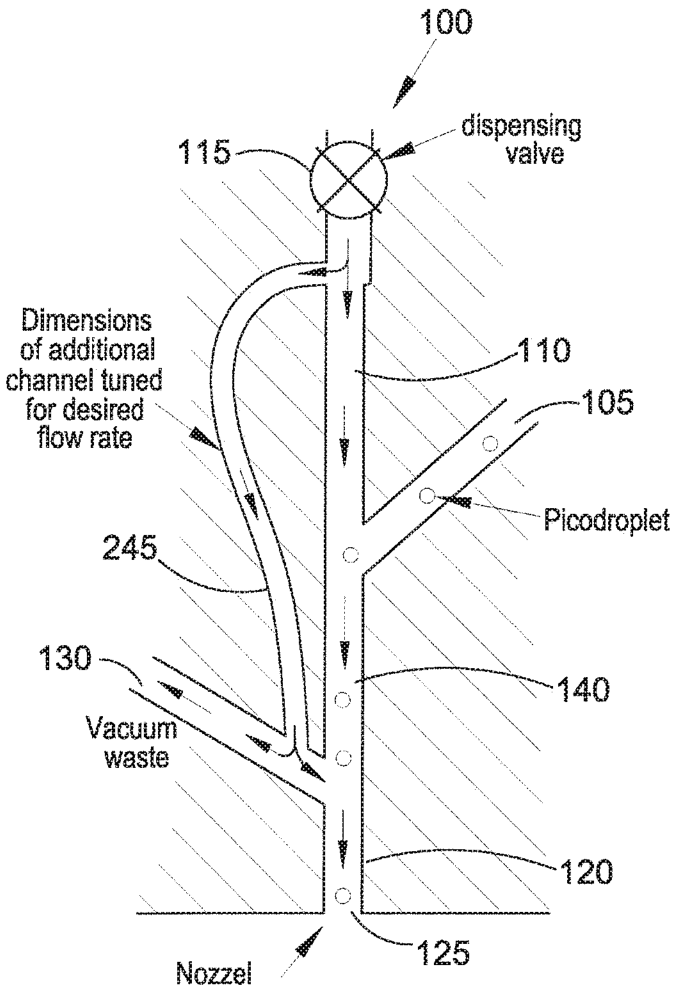
FIG. 5 shows a schematic illustration of a double T-junction droplet dispensing unit with a system for injecting oil using the dispensing valve to prevent excess waste droplets according to an embodiment of the present invention.

FIG. 5 shows a schematic illustration of a double T-junction droplet dispensing unit with a system for injecting oil using the dispensing valve to prevent excess waste droplets according to one embodiment of the present invention. Many features of this embodiment are the same as those shown in FIG. 3 and therefore carry the same reference numerals, however the third input channel 245 is coupled with the dispensing valve 115. The dimensions of the third input channel 245 can be tuned to provide fluid resistance and restrict the flow such that the picodroplets entering the dispensing region do not have a preference to travel back up the first input channel 110 and then down the third input channel 245.

It will be appreciated that preferred embodiments of a droplet dispenser may combine the approach of FIG. 2 with that of FIGS. 3 to 5.

It will be appreciated that the dispensing unit may have a rotary valve which can be used to selectively direct a droplet into a fluid flow linking with the dispenser output channel or into a fluid flow linking with the waste channel.

It will be appreciated that the dispensing unit may not be limited to picodroplets, but could be scaled up for droplets of various sizes.

It will be appreciated that the techniques described above may be applied in broader applications to protect up/down stream fluidics from pressure fluctuations cause by other means such as sorting, dispensing, valves opening/closing inter alia.

We have described techniques which, in preferred embodiments, are applied to processing droplets of a water-in-oil emulsion containing biological entities. In principle however non-biological entities, such as organic or inorganic materials, may be processed in a similar manner. Likewise the techniques we describe are also in principle applicable to processing droplets of oil in oil-in-water emulsions.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A microfluidic droplet dispensing system, the system comprising:

a droplet feed line to carry droplets for dispensing;

a first dispensing line to carry dispensing fluid for dispensing the droplets;

a droplet outlet line coupled to a droplet outlet;

a spacing line to carry further dispensing fluid for spacing the droplets;

a flow restriction line;

a first pressure source to provide pressurized dispensing fluid to said dispensing line to eject droplets from said droplet outlet a first junction where the flow restriction line, the dispensing line, and the droplet outlet line intersect, the first junction having a first input to receive a flow of droplets from the flow restriction line, having a second input to receive a flow of pressurized dispensing fluid from said dispensing line and having an output to said droplet outlet line, wherein the first junction is downstream of the first pressure source and the dispensing line;

a waste line intersecting said droplet outlet line at a waste line junction between said first junction and said droplet outlet, wherein the waste line junction is downstream of the first junction;

a droplet dispensing valve between said first pressure source and said dispensing line to control the ejection of droplets from said droplet outlet;

a second pressure source to provide pressurized dispensing fluid to the spacing line;

a second junction where the droplet feed line, the spacing line, and the flow restriction line intersect, the second junction having a first input to receive a flow of droplets from said droplet feed line, having, a second input to receive a flow of dispensing fluid from said spacing line, and having an output to the flow restriction line, wherein the second junction is downstream of the droplet feed line and the spacing line, and where the second junction is upstream of the flow restriction line and the first junction; and wherein the flow restriction line extends between the output of said second junction and the first input of said first junction to restrict a volume flow from said second junction into said first junction.

2. A microfluidic droplet dispensing system as claimed in claim 1 wherein said first pressure source and said second pressure source comprise the same pressure source.

3. A microfluidic droplet dispensing system as claimed in claim 1 wherein said second pressure source provides a pressure equal to or greater than said first pressure source.

4. A microfluidic droplet dispensing system as claimed in claim 1 further comprising a suction pump coupled to said waste line to provide a waste flow into said waste line when said dispensing valve is closed; and wherein said flow restriction line is configured to restrict said volume flow sufficiently that a volume flow in said droplet outlet line is equal to or less than said waste flow when said dispensing valve is closed.

5. A microfluidic droplet dispensing system as claimed in claim 1 comprising a disposable microfluidic cartridge configured for droplet processing/assay and having a substrate bearing said lines and junctions; wherein said droplets comprise droplets of water in oil; and wherein said dispensing fluid comprises oil.

6. A method of microfluidic droplet dispensing, the method comprising:

using a microfluidic droplet dispensing system as claimed in claim 1 in a method comprising:

receiving droplets for dispensing in a droplet feed line;

providing said droplets for dispensing to a droplet outlet line coupled to a droplet outlet;

allowing a waste flow from said droplet outlet line;

controlling the ejection of droplets from said droplet output by selectively applying increased pressure to said droplet outlet line; and protecting droplets in said droplet feed line from said selectively applied increased pressure by pressurising a region of said droplet feed line upstream of a location where said increased pressure is applied.

7. A microfluidic droplet dispensing system, the system comprising:

a droplet feed line to carry droplets for dispensing;

a dispensing line to carry dispensing fluid for dispensing the droplets;

a droplet outlet line coupled to a droplet outlet;

a first pressure source to provide pressurized dispensing fluid to said dispensing line to eject droplets from said droplet outlet;

a first junction where the droplet feed line, the dispensing line, and the droplet outlet line intersect, the first junction having a first input to receive a flow of droplets from said droplet feed line, having a second input to receive a flow of pressurized dispensing fluid from said dispensing line and having an output to said droplet outlet line, wherein the first junction is downstream of the first pressure source and the dispensing line;

a waste line intersecting said droplet outlet line at a waste line junction between said first junction and said droplet outlet, wherein the waste line junction is downstream of the first unction;

a droplet dispensing valve between said first pressure source and said dispensing line to control the ejection of droplets from said droplet outlet;

wherein the system further comprises:

an injection line, intersecting the waste line at a second junction, to inject dispensing fluid into the waste line in synchrony with opening of the dispensing valve.

8. A microfluidic droplet dispensing system as claimed in claim 7 wherein said injection line is coupled to said droplet dispensing valve.

9. A microfluidic droplet dispensing system as claimed in claim 7 wherein said injection line is coupled to an injection valve configured to operate in synchrony with said droplet dispensing valve.

10. A microfluidics droplet dispensing system as claimed in claim 7 wherein one or more of said lines have a fluorinated internal wall.

11. A microfluidics droplet dispensing system as claimed in claim 7, further comprising a dispensing fluid within the dispensing line, wherein said dispensing fluid comprises an oil carrier including one or more fluorinated surfactants.

12. A microfluidics droplet dispensing system as claimed in claim 1 wherein one or more of said lines have a fluorinated internal wall.

13. A microfluidics droplet dispensing system as claimed in claim 1, further comprising a dispensing fluid within the dispensing line, wherein said dispensing fluid comprises an oil carrier including one or more fluorinated surfactants.

14. A method as claimed in claim 6 wherein one or more of said lines have a fluorinated internal wall.

15. A method as claimed in claim 6 wherein said dispensing fluid comprises an oil carrier including one or more fluorinated surfactants.

* * * * *